United States Patent [19]

Konishi

[11] Patent Number: 4,599,062
[45] Date of Patent: Jul. 8, 1986

[54] ENCAPSULATION MOLDING APPARATUS

[75] Inventor: Akira Konishi, Kyoto, Japan

[73] Assignee: Dai-Ichi Seiko Co., Ltd., Kyoto, Japan

[21] Appl. No.: 682,471

[22] PCT Filed: Jan. 25, 1982

[86] PCT No.: PCT/JP82/00023
§ 371 Date: Nov. 9, 1982
§ 102(e) Date: Nov. 9, 1982

[87] PCT Pub. No.: WO82/02624
PCT Pub. Date: Aug. 5, 1982

Related U.S. Application Data

[63] Continuation of Ser. No. 442,226, Nov. 9, 1982, abandoned.

[30] Foreign Application Priority Data

Jan. 26, 1981 [JP] Japan .............................. 56-10766[U]
Jan. 26, 1981 [JP] Japan .............................. 56-10767[U]

[51] Int. Cl.⁴ ..................... B29C 45/02; B29C 45/14
[52] U.S. Cl. ............................ 425/116; 264/272.17;
264/328.8; 425/125; 425/544
[58] Field of Search ................ 264/272.14, 272.15,
264/272.17, 328.8, 328.12; 425/116, 120, 121,
125, 544; 29/588

[56] References Cited

U.S. PATENT DOCUMENTS

| 2,382,200 | 8/1945 | Brunner | 264/328.5 |
| 3,013,308 | 12/1961 | Armour | 264/328.8 |
| 4,347,211 | 8/1982 | Bandoh | 425/544 |
| 4,368,168 | 1/1983 | Slepcenic | 264/272.14 |

FOREIGN PATENT DOCUMENTS

| 2900114 | 2/1980 | Fed. Rep. of Germany | 264/272.17 |
| 43366 | 4/1977 | Japan | 264/272.17 |
| 143656 | 12/1978 | Japan | 264/272.17 |
| 101858 | 8/1979 | Japan | 264/272.14 |
| 152970 | 12/1979 | Japan | 264/272.17 |
| 55-29813 | 8/1980 | Japan | 264/328.4 |

Primary Examiner—James Lowe
Attorney, Agent, or Firm—Armstrong, Nikaido, Marmelstein & Kubovcik

[57] ABSTRACT

The disclosure is directed to an encapsulation molding apparatus to be used for subjecting small-sized electrical elements to encapsulation molding by a synthetic resin material. The present invention has been presented for the purpose of shortening the cycle time required for the encapsulation molding, and also, reducing cost necessary for molding metal molds, and installation cost for a molding press, etc., with a simultaneous reduction of a loss in the synthetic resin material. More specifically, in the apparatus of the present invention, for subjecting small-sized electrical elements to encapsulation molding by the synthetic resin material, pots (30) for charging the synthetic material thereinto are provided at preferably equal intervals with respect to a plurality of cavities provided in an upper mold (11) and a lower mold (12) for the formation of encapsulation molded portions, while extruding plungers (31) are provided for the respective pots for effecting the encapsulation molding. The apparatus according to the present invention may be advantageously employed as a resin encapsulating apparatus for semi-conductor devices, etc.

5 Claims, 7 Drawing Figures

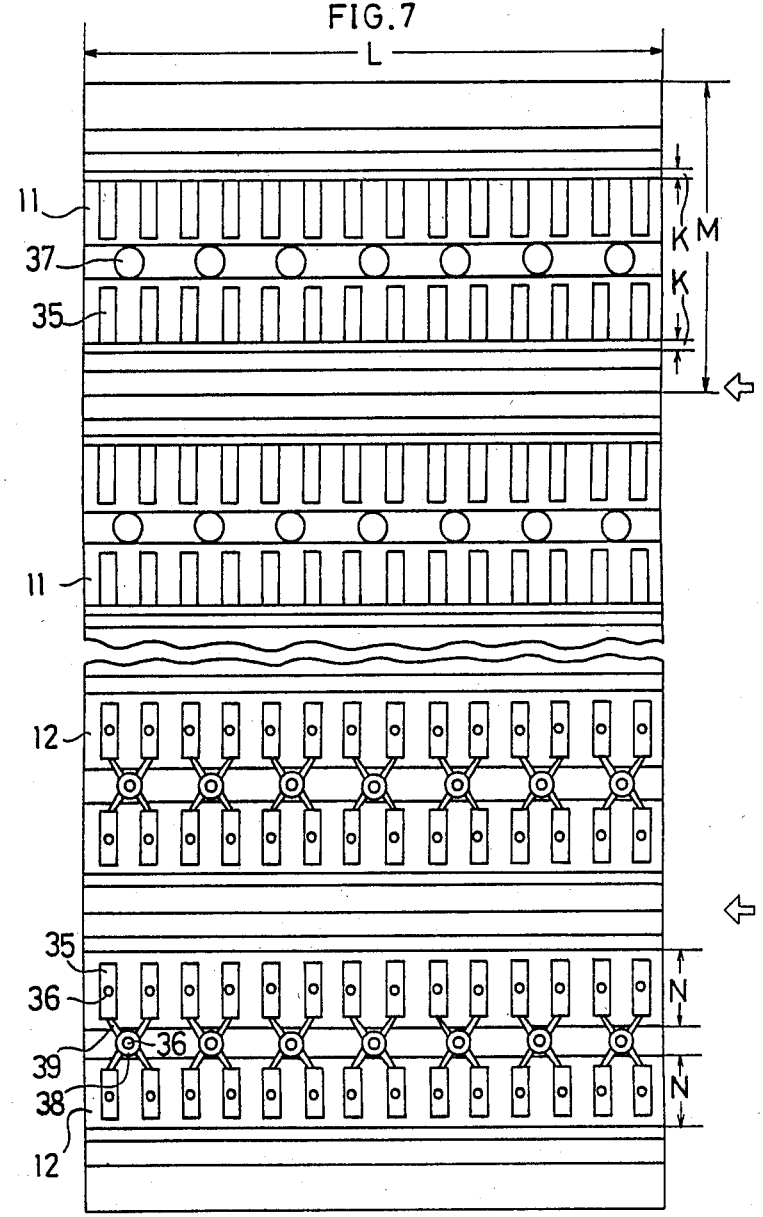

ENCAPSULATION MOLDING APPARATUS

This is a continuation of application Ser. No. 442,226, filed Nov. 9, 1982, now abandoned.

TECHNICAL FIELD

The present invention generally relates to encapsulation by transfer molding and more particularly, to an encapsulation molding apparatus or transfer molding press for use in encapsulation by transfer molding of miniature or small-sized electrical elements with employment of a synthetic resin.

TECHNICAL BACKGROUND

Conventionally, it has been a common practice that miniature or small-sized electrical elements are preliminarily attached, at a predetermined pitch or interval, to a lead frame of a thin sheet blanked to form a large number of terminals as shown in FIG. 1. Subsequently, the electrical elements thus prepared are formed into a package by a thermosetting resin material such as phenolic resin, epoxy resin and the like so as to be made into product main body resin portions (2) as shown in a side elevational view of FIG. 2, and thereafter, formed into finished products through processes for cutting off the terminal portions along one-dotted chain lines, trimming at opposite selvadge or edge portions, and finally folding the respective terminals along side faces of said resin portion (2). In connection with the above, the packaging work by the synthetic resin material as described above is normally effected on a large scale through mass production by the employment of a transfer molding press in which metal molds for packaging are set.

FIG. 3 shows such packages formed by a conventional apparatus in a state as they are withdrawn from metal molds, with a portion at the upper right equivalent to slightly over ¼ of the entire drawing being represented in a top plan view for convenience of illustration. In FIG. 3, there is provided a cull portion (3) formed at a sprue located at the central portion of the metal molds, and connected to respective encapsulation molded resin portions (2) through portions each formed by gates (4) and runners (5) of the metal molds.

Incidentally, in the metal molds, shallow recesses into which the sprue (3), runners (5), gates (4) and lead frames (1) are fitted, are mainly formed in a lower mold, while cavities into which the resin material is injected under pressure to form the product main body resin portions (2), are formed in an upper mold and the lower mold. The upper mold is further formed with a through-opening in a position immediately above the sprue (3) of the lower mold, to which opening, a lower half portion of a pot for charging the resin material thereinto is fixedly connected. The resin material as described above heated in the pot so as to be in a semi-molten state is injected into the cavities referred to above by an extruding plunger connected to a rod of a pressing cylinder of a molding press through the sprue (3), runners (5) and gates (4) so as to form the respective encapsulation molded resin portions (2) through pressurization. In the above case, since the upper and lower molds of the metal molds are respectively clamped in contact with an upper plate and a lower plate in which heaters are embedded, these upper and lower molds are heated up to a predetermined temperature through heat conduction, but, between one resin portion (2) at a position A which is molded at the cavity closest to the pot i.e. the sprue (3) and another resin portion (2) at a position B to be molded at the cavity farthest from the sprue (3) on the contrary, there is a difference in the time required for the resin material to reach there. Accordingly, owing to the necessity for the resin material which has flowed into the cavity at the position B to retain a fluidity required for the pressure molding, it is so arranged that a filler which delays the hardening time i.e. which increases the fluidity index is mixed into the whole resin material. With the use of the molten resin material as described above, the resin material is poured under pressure from the pot into the respective cavities through the plunger referred to earlier so as to be subjected to a pressure molding, with a subsequent curing to achieve sufficient hardening, and thus, in the conventional practice, at least 2.5 to 3.0 minutes have been required for one packaging work. In the example as shown in FIG. 3, the encapsulation molded resin portions (2) of 14×2×3×4=336 pieces in number are to be formed by the one packaging operation as described above, but as may be assumed from the foregoing description, such conventional arrangement has drawbacks as raised hereinbelow.

(I) Since the conditions should be so arranged that the encapsulation molding at the cavity located in a position farthest from the pot can be perfectly effected, the cycle time for the encapsulation molding tends to be prolonged.

(II) Due to the prolonged cycle time for the encapsulation molding as described above, the number of cavities must be increased for improving the productivity, and as a result, metal molds tend to be large in size, with a consequent rise in the manufacturing cost, while, owing to the necessity to employ a large-sized molding press for setting the bulky metal molds, installation cost may also be increased undesirably.

(III) Since the length of the runners is increased, loss of the synthetic resin material is also increased, and thus, the ratio of the total product weight to the total material weight is low at 55 to 60%.

Accordingly, an essential object of the present invention is to provide an improved encapsulation molding apparatus in which the disadvantages in the conventional encapsulation molding apparatuses have been substantially eliminated.

DISCLOSURE OF THE INVENTION

Specifically, the present invention relates to an encapsulation molding apparatus which is so arranged that, in the encapsulation molding of miniature electrical elements by a synthetic resin material, there are provided a plurality of pots preferably disposed at equal distances for injecting the synthetic resin material into a plurality of cavities which form the encapsulation molded resin portions provided in the metal molds, while extrusion plungers are provided for each of the pots to effect the encapsulation molding. By the above arrangement of the present invention, the ratio of the total weight of the encapsulation molded resin portions of the products to the weight of the required synthetic resin material may be improved up to at least 85% or thereabout from the conventional ratio at 55 to 60%. Moreover, since a quickly hardening thermosetting resin with less fluidity index may be employed, the cycle time for the packaging work may be reduced to a large extent, for example, to approximately ⅓ of the conventional arrangements. Accordingly, size of the metal molds required for a case where the same products are packaged in approximately the same number during the same working hours can be reduced to about ⅓ as compared with that in conventional arrangement, and thus, it has become possible not only to save the manufacturing cost of the metal molds, but also to simultaneously reduce the installation cost for the transfer molding press itself.

Furthermore, according to the present invention, the respective plungers for the encapsulation molding apparatus are resiliently supported. By this arrangement, even in cases where some pots are filled with a slightly larger amount of resin material or there are some differences in the length of the extruding plungers, the injecting pressure or molding pressure with respect to any of the cavities may be maintained constant so as to provide package products having a uniform quality.

BEST MODE FOR EFFECTING THE INVENTION

For describing the present invention more in detail, explanation will be given hereinbelow with reference to the accompanying drawings.

Figure 1:
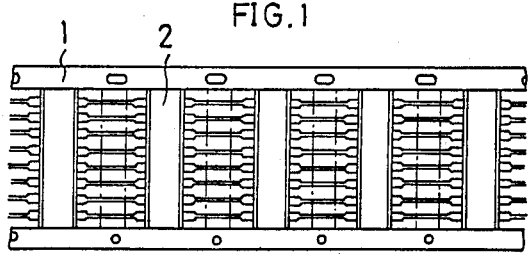
FIG. 1 is a fragmentary top plan view showing one example of a lead frame after encapsulation molding of small-sized or miniature electrical elements by a synthetic resin.
Figure 2:
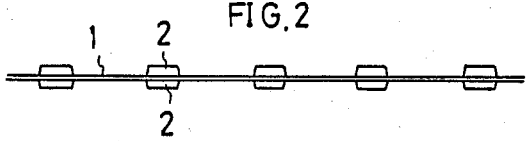
FIG. 2 is a side elevational view of the lead frame of FIG. 1.
Figure 3:
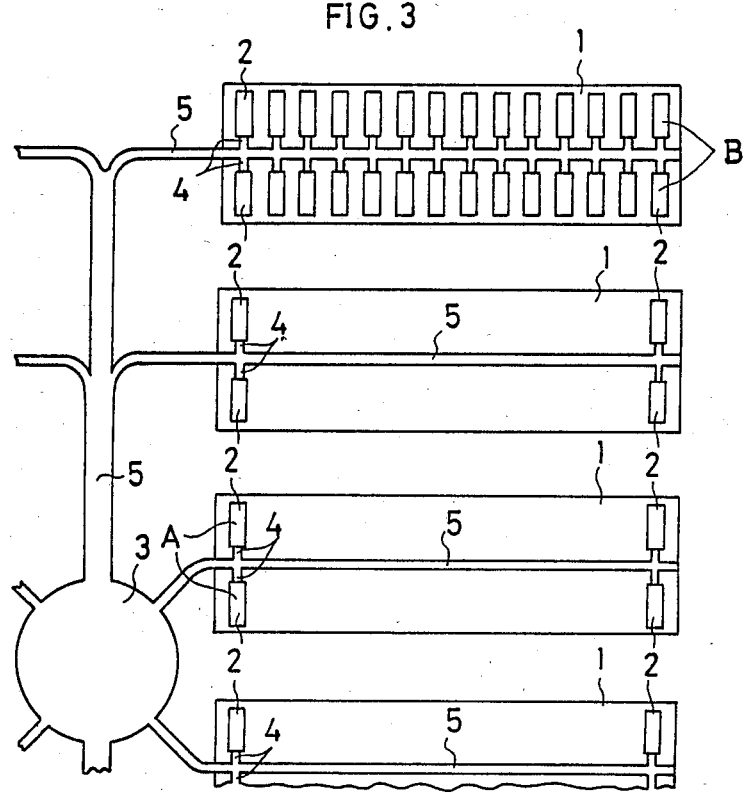
FIG. 3 is a fragmentary top plan view of a package assembly as subjected to packaging by the conventional apparatus, showing the state as the assembly is taken out from metal molds.
Figure 4:
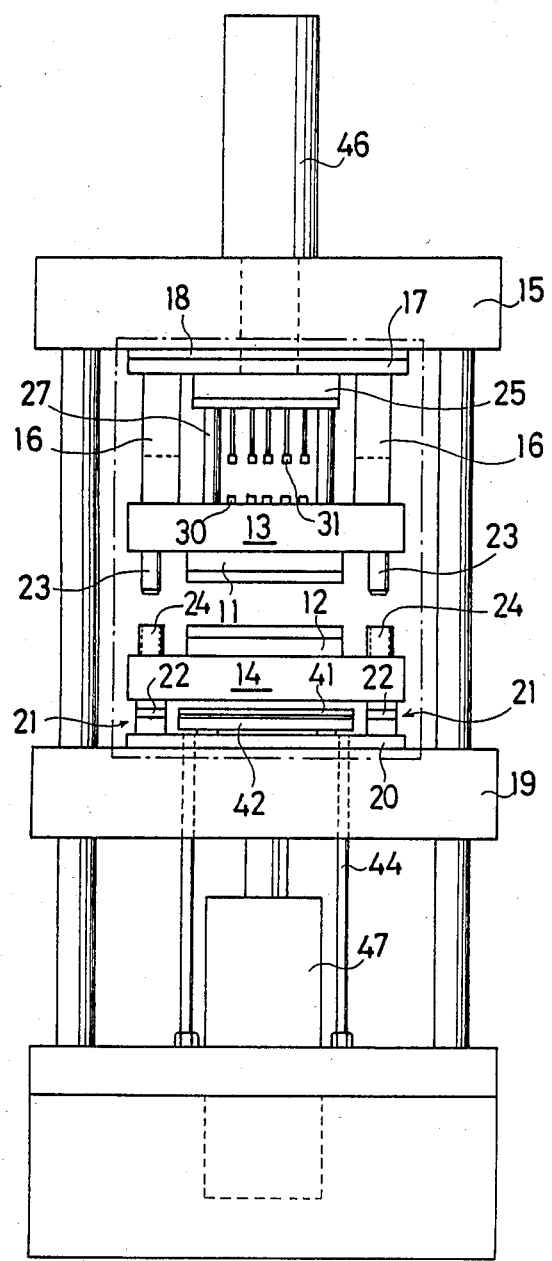
FIG. 4 is an external side elevational view of an encapsulation molding apparatus according to one preferred embodiment of the present invention.
Figure 5:
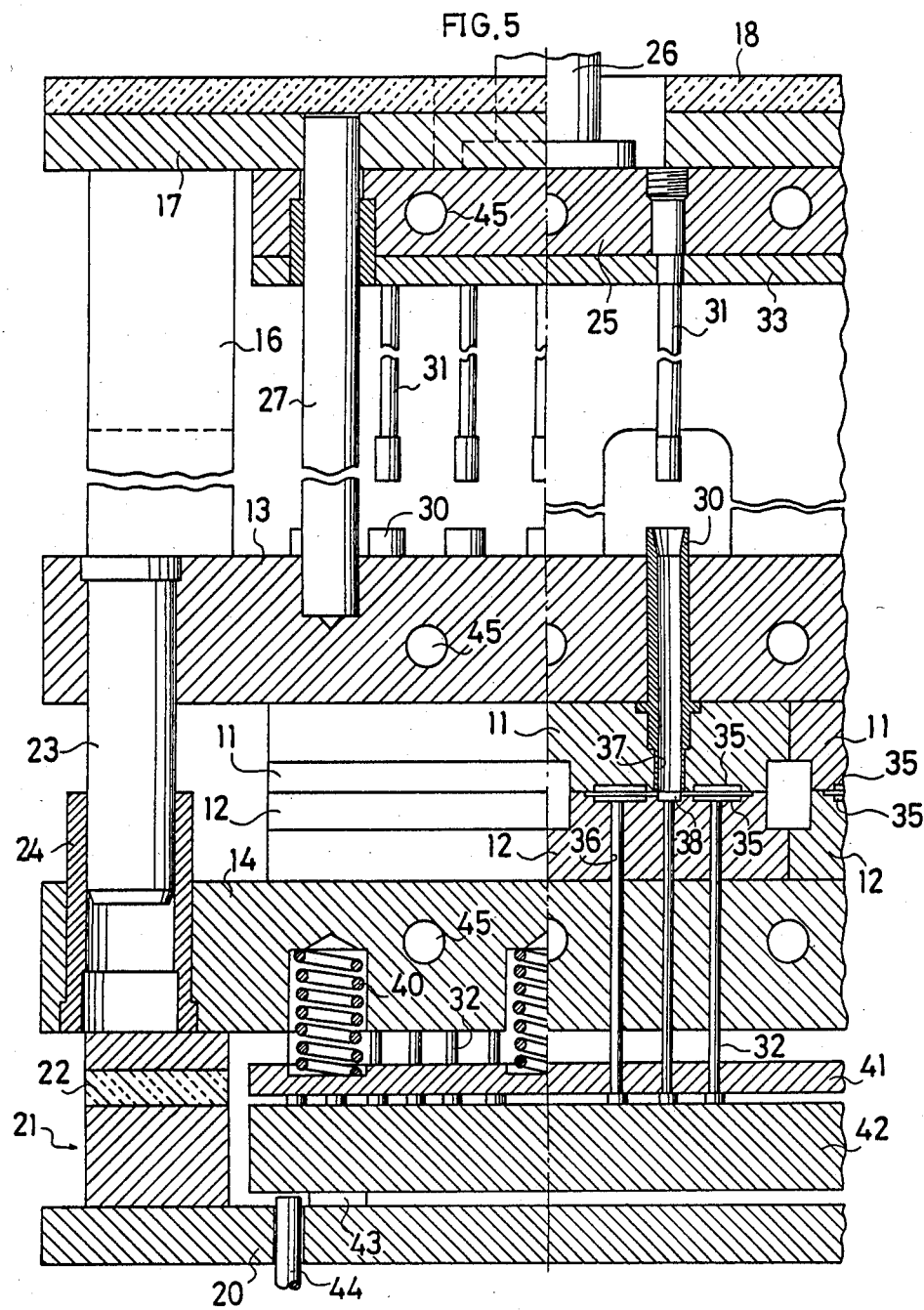
FIGS. 5 and 6 are cross sectional views showing in detail, the portion surrounded by one-dotted chain lines in FIG. 4, and FIG. 7 are top plan views showing the upper mold at the upper half portion and the lower mold at the lower half portion, respectively at the joining surfaces thereof, with respect to the metal molds to be employed in the apparatus according to the embodiment of the present invention.
Figure 6:
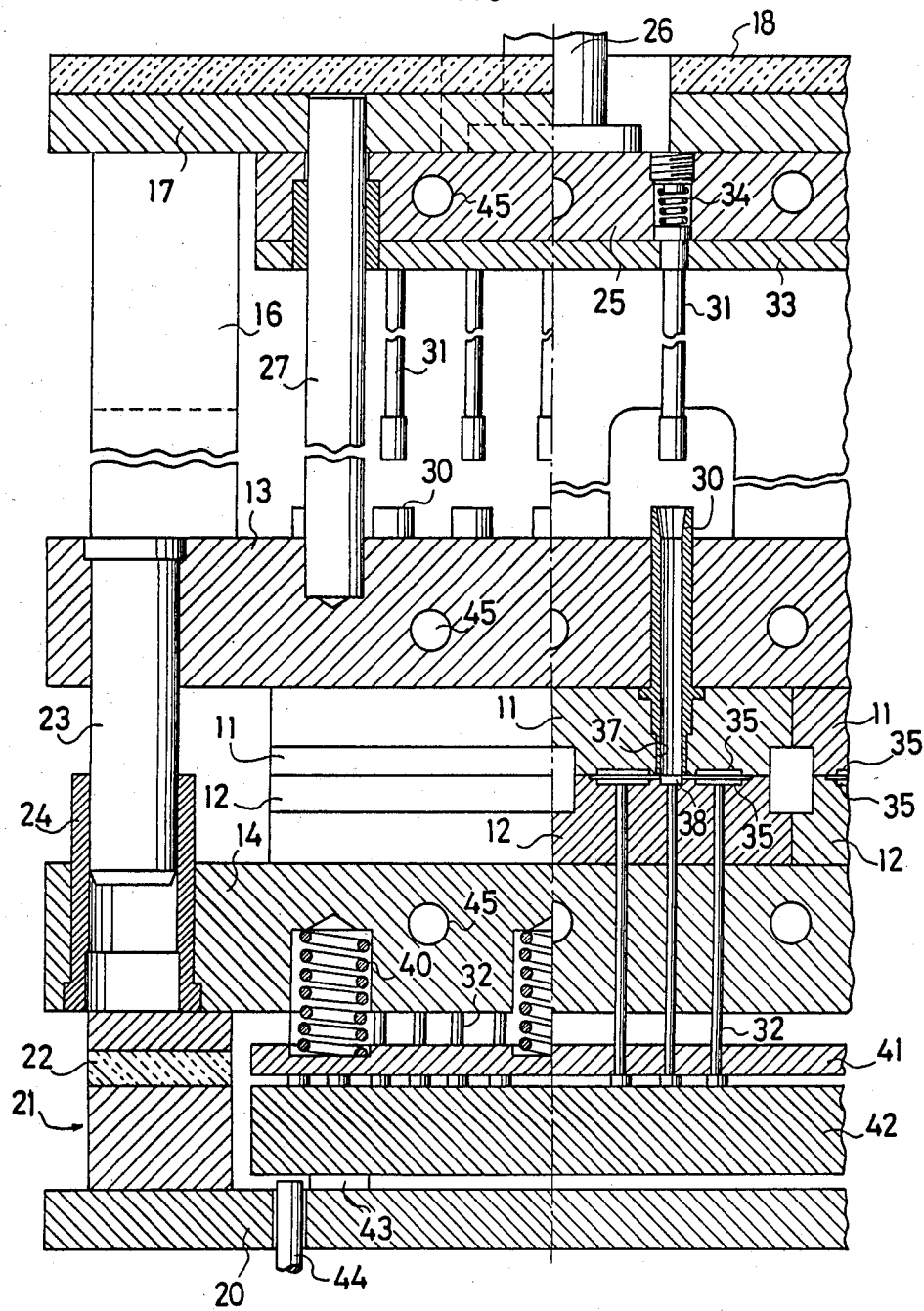

FIG. 4 shows the external side elevational view of the entire apparatus according to the present invention, and FIGS. 5 and 6 are detailed cross sectional views of the portion surrounded by the one-dotted chain lines in FIG. 4, in which the leftward half portion of said portion is shown at the left side of the center line of the one-dotted chain line as a cross section passing the center of the guide post, while at the right side of said center line, different from said portion, part of the front face is illustrated as a cross section passing through the center of the pot. In the drawings, there are shown an upper mold (11) and a lower mold (12) of metal molds which are respectively set on an upper mold plate (13) and a lower mold plate (14) of the press main body. The upper mold plate (13) is secured to a fixing base (15) of the press main body through a pair of left and right support blocks (16), and an intermediate plate (17) and a heat insulation plate (18) which respectively have through-openings, at their central portions, for passing a rod (26) of a hydraulic cylinder or ram (46) therethrough, while the lower mold plate (14) is fixed to a movable base (19) of the press main body for clamping the metal molds through an intermediate plate (20) and another pair of support blocks (21), with heat insulating plates (22) being inserted into the respective support blocks (21) as shown. Moreover, guide posts (23) are secured respectively to four corners of the upper mold plate (13), while at corresponding four corners of the lower mold plate (14), there are fixed guide bushes (24) for guiding said guide posts (23). There is further provided an extruding plate (25) which is connected to the rod (26) of the hydraulic cylinder (46) of the press main body so as to be vertically movable by being guided through four guide rods (27) secured, at end portions thereof, to the upper mold plate (13) and the intermediate plate (17), following the vertical movement of the rod (26).

Subsequently, before explaining abouts pots (30) to be disposed on the upper mold plate (13), and extruding plungers (31) mounted on the extruding plate (25), the upper molds (11) and lower molds (12) of the metal molds will be described hereinbelow based on FIG. 7, in which arrows indicate the direction coinciding with the front face at the rightward half portion in FIG. 5 or 6, while the upper molds and lower molds are respectively shown in the upper and lower halves of the drawing, as top plan views at the joining surfaces.

For the upper molds (11) and lower molds (12), four molds each having a length (L) and a width (M) are respectively combined so as to be set on the upper mold plate (13) and the lower mold plate (14) by the use of positioning pins. Each of the molds (11) and (12) is formed with cavities (35) provided at a predetermined pitch for molding the molded resin portions (2), and in the central portions of the respective cavities (35) and sprues (38) of each of the lower molds (12), fine through-holes (36) for knock-out pins (30) are formed. In the metal molds, there are further formed holes (37) in which the lower ends of the pots (30) are inserted for securing in addition to the sprues (38), which are respectively provided at the cental portions of the plurality of cavities (35) (four pieces in this embodiment) at a pitch two times that of the pitch for the disposition thereof. From each of the sprues (38), a plurality of gates (39) (four pieces in this embodiment) are radially extended as shown. In the case where the small-sized electrical elements are mounted, in parallel two rows, at a predetermined pitch on the lead frame (1) as shown in this embodiment, if each of the sprues (38) is arranged to be provided at the center of the four cavities (35) as shown in FIG. 7, the runners may be dispensed with, and only the gates (39) may be provided in the radial directions. It is to be noted here, however, that, although the positions of the sprues (38) and the number of gates (39) may be properly determined according to the shapes of the lead frame (1) and the attaching pattern of the miniature electrical elements to be mounted thereon, the essential point of this invention resides anyhow in that the sprues (38), i.e. the pots (30) are provided at positions preferably at equal distance from the cavities (35) to form the so-called runner-less metal molds. Furthermore, with respect to the lower mold (12), the portion with a width N symmetrical with the axis thereof is recessed by the thickness of the lead frame (1) from the joining surface of the mold.

In the other hand, with respect to the upper mold, the portion with a width K which the selvadge portion of the lead frame (1) contacts, is slightly recessed (for example, by about 2/100~3/100 mm) from the joining surface of the mold so as to serve as a vent for air and gas during injection under pressure of the molten resin material.

Incidentally, the pots (30) are inserted for securing into the holes (37) of the upper mold (11) located immediately above the sprues (38) of the lower mold (12). In this embodiment, the pots (30) in the number 7×4=28 pieces are arranged in a predetermined pitch. On the other hand, the extruding plungers (31) which are disposed on the extruding plate (25) in positions corresponding to the pots (30), are not rigidly secured to the extruding plate (25) but engaged with a fixing plate (33) at stepped portions of the head portions thereof, and thus, the plungers (31) are arranged to be pushed out as the extruding plate (25) is lowered.

Meanwhile, the above arrangement may be modified as shown in FIG. 6 that, by shortening the length of the head portion of each of the plungers (31), a compression coil spring (34) is accommodated in a space formed at its head portion so that the plunger (31) is resiliently supported by the extruding plate (25) through said compression coil spring (34).

Furthermore, the stroke of the extruding plate (25) i.e. the stroke of the rod (26) is so adjusted that, when the plungers (31) are pushed into the corresponding pots (30), the forward end faces thereof are registered with the joining position of the upper and lower molds (11) and (12). Each of the knock-out pins (32) is held at its head portion, between a presser plate (41) depressed downwards by compression coil springs (40) and a clamping plate (42) which are clamped together by bolts (not shown), while being inserted into a through-opening of the lower mold plate (14) and also into the fine through-hole (36) of the lower mold (12) connected therewith. There is provided a spacer washer (43) for restricting the forward end position of the knock-out pin (32), while a knock-out rod (44) is extended through the intermediate plate (20) and movable base (19) so as to be secured to a fixed base plate for free adjustment of its length. In the upper plate (13), lower plate (14) and extruding plate (25), there are respectively embedded heaters (45). The apparatus is provided with the hydraulic cylinder (46) for the pressure molding and another hydraulic cylinder (47) for mold clamping.

By the above arrangement, the functionings of the encapsulating molding apparatus of the present invention will be described hereinbelow.

In the first place, the movable base (19) is lowered through operation of the mold clamping cylinder (47) so as to cause the lower molds (12) to descend by a proper amount down to a loading position together with the lower mold plate (14). After fitting the lead frames (1) attached with the miniature electrical elements, into the predetermined positions of the recesses of the lower molds (12) each having the width N for setting, the movable base (19) is raised by the mold clamping cylinder (47) for engagement of the guide posts (23) and the guide bushes (24), and by raising the lower mold plate (14) so that its position with respect to the upper mold plate (13) is not deviated, the upper and lower molds (11) and (12) are accurately aligned with each other at the joining or mating surfaces thereof for effecting the mold clamping.

On the other hand, the electric heaters (45) are energized, and thus, the upper and lower plates (13) and (14), and the extruding plate (25) are heated, for example, up to about 170° C.

Subsequently, the thermo-setting resin, for example, in the form of a rod-like raw material is mounted into the respective pots (30). Since the pots (30) have been heated by heat conduction from the upper mold plate (13), the rod-like raw material as described above is made into a semi-molten state in less than 10 seconds. The above semi-molten resin material heated, for example, up to temperatures at about 160° to 170° C. is subjected to the pressure injection by the extruding plungers (31). More specifically, through operation of the hydraulic cylinder (46), the extruding plate (25) is lowered by the guiding of the guide rods (27), and the extruding plungers (31) are simultaneously pushed into the pots (30) so as to pressurize the semi-molten resin material for extrusion thereof through the pots (30), and thus, the semi-molten resin material is heated by the heat conduction from the metal molds during passing thereof through the sprues (38) and gates (39), and also, by frictional resistance which acts during the passing, and is brought into a fully molten state so as to be injected under pressure into the respective cavities (35) at one stroke. In the manner as described above, the encapsulation molded resin portions (2) are formed respectively in the upper and lower faces of the lead frames (1) for enclosing the miniature electrical elements therein.

In the above case, the rod-like raw material of the thermosetting resin has a thickness finer than the inner diameter of the pot (30) by approximately 1 mm, with a lengthwise volume thereof is determined to have a volume equivalent to the total of the volumes respectively occupied by the cavity (35), sprue (38) and gate (39), and thus, the injection pressure and the molding pressure are respectively maintained at a predetermined value, for example, at a value close to, for example, 50 Kg/cm$^2$.

Meanwhile, as shown in FIG. 6, in the case where the compression coil spring is provided at the head portion of the plunger (31), even when the volume of the rod-like raw material becomes slightly larger than the total of the volume occupied by the cavity (35), etc., the compression coil spring (34) is slightly compressed by the head portion of the extrusion plunger (31) to allow the plunger (31) to excape upwards, whereby the injection pressure and the molding pressure may be respectively maintained at a value close to the constant value. Moreover, since the compression coil spring (34) functions as described above, even in the case where there is a slight difference in the length of the plunger (31) itself, the above injection and molding pressure may be maintained constant with respect to any of the cavities (35), thus serving for maintaining a predetermined quality of the products.

In the above arrangement, discharging of air and gas from the cavities (35), etc. during the injection under pressure is mainly effected through the gap or clearance between the upper mold (11) and the selvadge portion of the lead frame (1) as described previously. Furthermore, the extruding plate (25), upper mold plate (13) and lower mold plate (14) are each heated by the respective electric heaters (45) so as to be maintained at the same temperature, and thus, it is arranged that no deviations take place in the respective pitch for disposition of the pots (30) and the plungers (31) by the difference in the thermal expansion due to temperature differences.

The extruding plungers (31) pushed out up to the joining surfaces of the upper mold (11) and lower mold (12), are maintained as they are in that position for about 20 to 30 seconds for effecting curing of the encapsulation molded portions (2).

At the selvadge portions of the lead frame (1) contacting the cavities (35), the molten resin material leaks out together with air and gas to form a burr in the form of a thin layer, which may be treated later simultaneously as the selvadge portions are trimmed off later.

Thereafter, the extruding plate (25) is returned to the position as shown in FIG. 5 by the hydraulic cylinder (46), with the extruding plungers (31) being retained at the stand-by position. On the other hand, by lowering the lower mold plate (14) by the mold clamping cylinder (47) together with the movable base (19), the lower mold (12) is separated from the upper mold (11).

After the above procedure, when the lower mold plate (14) is slightly lowered by the mold clamping cylinder (47), the clamping plate (42) is brought into contact with the knock-out rod (44) to be stopped in its movement. Accordingly, upon further descent of the lower mold plate (14) down to the knock-out position (i.e. the lower limit position), the presser plate (41) and clamping plate (42) both remain stationary, and therefore, lowering is effected by the compression of the compression coil spring (40), with the knock-out pins simultaneously projecting out of the fine through-holes (36) of the lower mold (12) by that amount, and thus, the encapsulation molded portions (2) are drawn out together with the cull portions, etc. hardened at the sprues (38) and gates (39).

By the processing as described so far, one cycle of the encapsulation molding operation of the miniature electrical elements attached to the lead frames (1) by the synthetic resin, i.e. one cycle of the packaging work is completed.

POSSIBILITIES FOR INDUSTRIAL UTILIZATION OF THE INVENTION

As is clear from the foregoing description, the encapsulation molding apparatus according to the present invention is used for manufacturing package products formed by subjecting miniature or small-sized electrical elements to the encapsulation molding by the thermosetting resin material. In the apparatus of the present invention, since the so-called gang pot system including the large number of pots (30) and corresponding extruding plungers (31) is employed, while the so-called runner-less system in which the runners are dispensed with is adopted for the metal molds (11) and (12), it is not required to mix a filler which delays the hardening time, into the thermosetting resin material, and thus, a quick hardening resin material with small fluidity index may be employed as it is. Accordingly, the cycle time required for the packaging work is only about 60 seconds, even when the rather troublesome charging operation of the resin raw material into the pots (30) is taken into account, and therefore, the cycle time in the case of the conventional arrangements has been markedly reduced to about ⅓ for improved efficiency in the packaging work. In the embodiment described so far, package products of 112 pieces can be produced by one packaging work. Accordingly, in the cycle time for packaging, for example, 336 pieces which are equivalent to one lot of the conventional arrangements, the work can be repeated three times in the apparatus of the present invention, and as a result, the amount of production can be equally maintained through the efficient operation.

What is claimed is:

1. An encapsulating molding apparatus, comprising:
    an upper mold, having a plurality of cavities;
    a lower mold opposing said upper mold and having cavities corresponding to said upper mold cavities;
    a plurality of pots disposed on one of said molds for supplying a plastic material or the like to said cavities;
    a plurality of extruding plungers, each one slideable with a corresponding pot, said extruding plungers being supported by an extruding plate, and said extruding plate being connected to a rod of a pressure cylinder for moving said plungers within said pots; and
    a plurality of gates exclusively connecting each one of said pots to a plurality of said cavities for conveying the plastic material to said cavities.

2. The encapsulation molding apparatus of claim 1, including means for elastically supporting said extruding plungers on said extruding plate.

3. The encapsulation molding apparatus of claim 1, wherein said gates, connecting each one of said pots to said plurality of corresponding cavities, have lengths equal to one another.

4. The encapsulation molding apparatus of claim 3, wherein four gates extend from each one of said pots to four corresponding cavities.

5. The encapsulation molding apparatus of claim 2, wherein said elastically supporting means includes a spring disposed between each extruding plunger and said extruding plate.

* * * * *